Sept. 7, 1937.   G. W. REHFELD   2,092,183
MAT FOR PROTECTING BANKS OF STREAMS
Filed Dec. 2, 1935   2 Sheets-Sheet 1
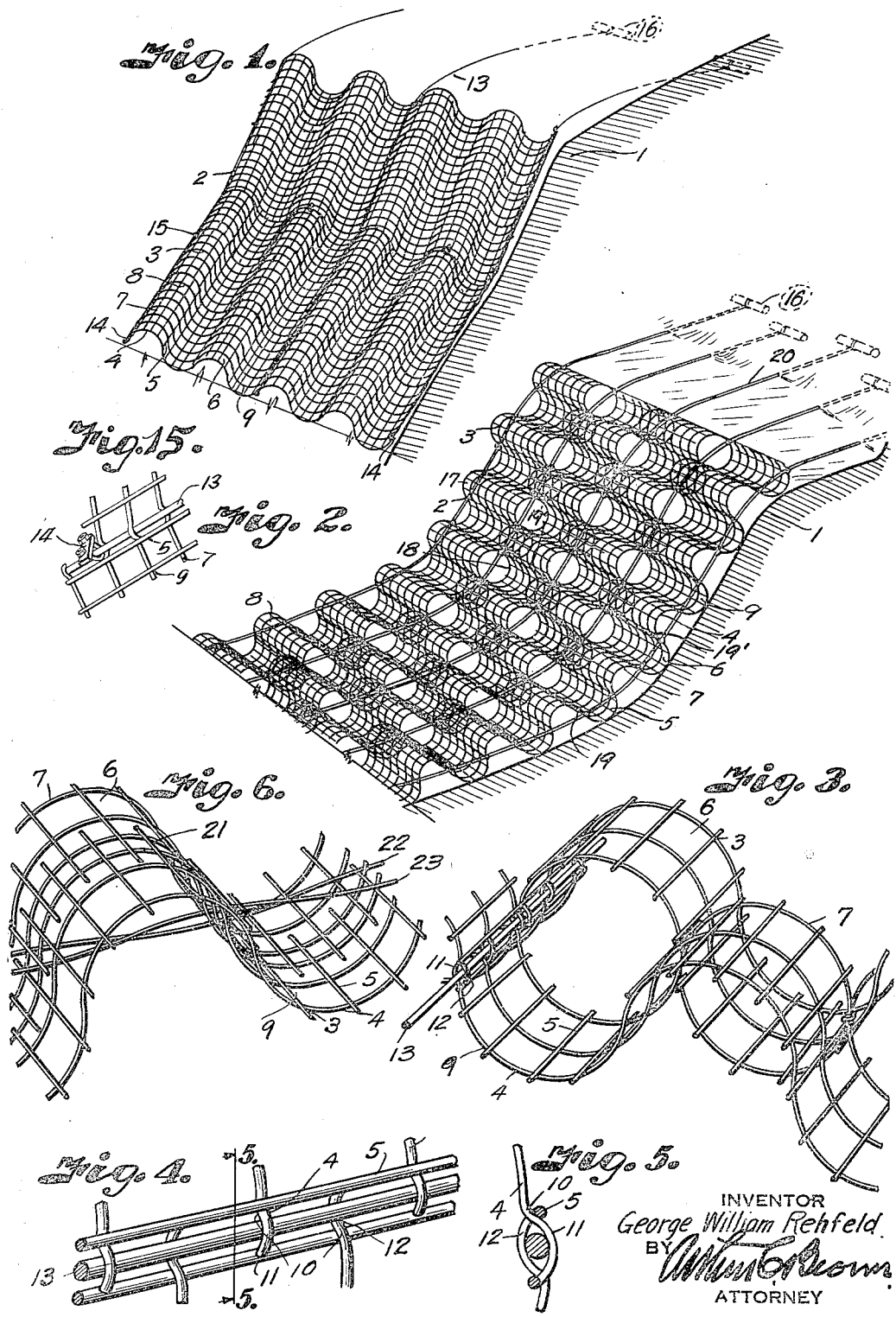
INVENTOR
George William Rehfeld
BY
ATTORNEY Sept. 7, 1937.   G. W. REHFELD   2,092,183
MAT FOR PROTECTING BANKS OF STREAMS
Filed Dec. 2, 1935    2 Sheets—Sheet 2
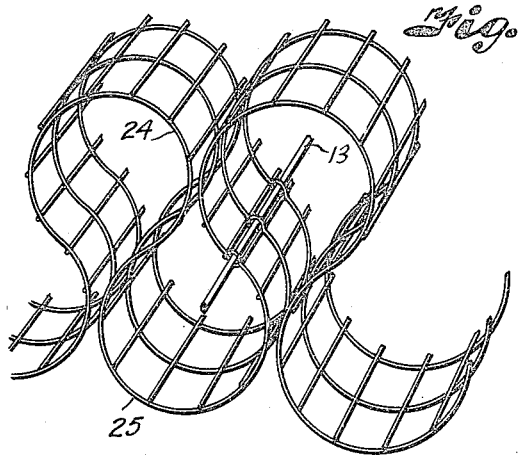
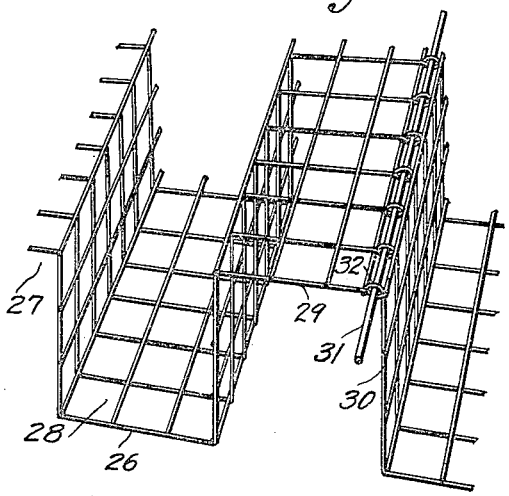
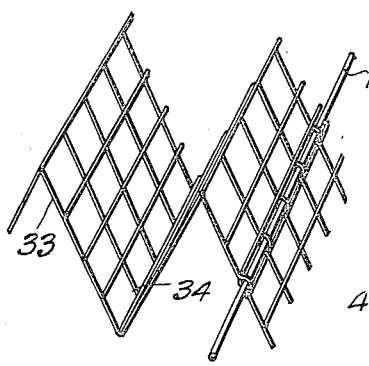
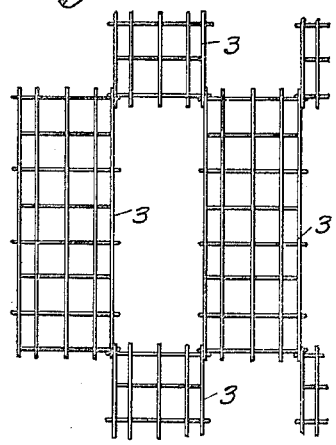
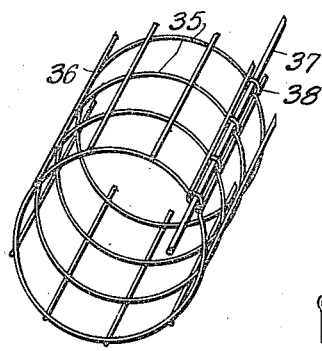
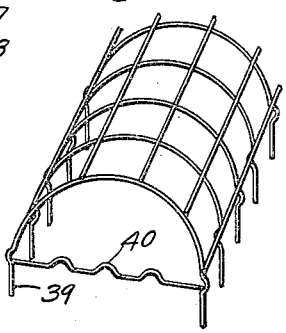
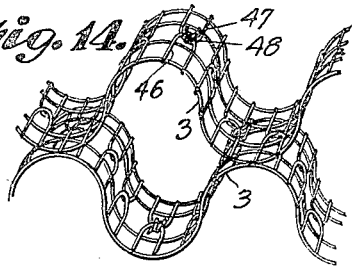
INVENTOR
George William Rehfeld
BY
ATTORNEY Patented Sept. 7, 1937

2,092,183

UNITED STATES PATENT OFFICE 2,092,183

MAT FOR PROTECTING BANKS OF STREAMS

George William Rehfeld, Manhattan, Kans.

Application December 2, 1935, Serial No. 52,521

12 Claims. (Cl. 61—38)

This invention relates to revetments, and particularly to those consisting of open-work mats to be anchored along the bank of a stream for effecting accretion and preventing erosion of the soil as desired. As is well known, erosion of the banks of streams begins when velocity flow of the current is fast enough to pick up and carry in suspension particles of matter, and when once started the erosion progresses with rapidity, but when the velocity is retarded below the point at which the particles may be carried in suspension, erosion ceases and accretion begins. Thus, erosion of a stream bank can be prevented and the bank can be built up at selected points to control the channel of a moving body of water.

It is, therefore, the principal object of the present invention to provide a simple, inexpensive mat construction which promotes retardation of flow and which catches and holds the alluvium, grasses, roots, and other fine extraneous matters carried in a stream.

It is also an important object of the present invention to provide a flexible mat construction that readily adapts itself to the contour of the bank on which it is anchored without preliminarily shaping the bank, and which retains its contact with the bank at all times.

Other important objects of the invention are to provide a mat composed of preformed sections which are readily connected together in various groups by means of anchoring rods, to provide an open, flexible mat construction for promoting growth of vegetation in the soil collected thereby to further build up and enhance rigidity of the bank against scouring tendency of the current, and to provide a flexible mat structure that may be extended out into the stream to further prevent encroaching action of the current.

In accomplishing these and other objects of the invention, as hereinafter pointed out, I have provided improved details of construction, the preferred forms of which are illustrated in the accompanying drawings wherein:

Fig. 1 is a perspective view of a bank protected by a mat construction in accordance with the present invention.

Fig. 2 is a similar perspective view illustrating a modified form of grouping for the respective units which compose the mat.

Fig. 3 is an enlarged detail perspective view of a portion of a mat wherein the units extend longitudinally of the bank as in the form shown in Fig. 1, but in staggered relation with each other and particularly illustrating the method of connecting the mat units together by means of anchoring rods.

Fig. 4 is an enlarged detail perspective view showing the connection of a pair of adjacent units by means of the anchoring rods.

Fig. 5 is a cross section on the line 5—5 of Fig. 4.

Fig. 6 is a detail perspective view of a portion of a mat, particularly illustrating a modified method of securing the anchoring rods and showing the mats arranged with the corrugations in aligning overlapping relation.

Fig. 7 is a detail perspective view showing another modified method of grouping the mat units.

Fig. 8 is a detail perspective view of a modified form of mat.

Fig. 9 is a similar view of a still further modified form of the invention.

Fig. 10 is a plan view showing the mat units arranged in staggered formation.

Fig. 11 shows a cylindrical type of mat unit.

Fig. 12 is a further modified form of unit wherein the unit assumes a semi-cylindrical form, particularly for use in ditches and small gullies as in the case of soil erosion of farms.

Fig. 13 illustrates a modified form of the unit shown in Fig. 12.

Fig. 14 shows a further modified form of interconnection for the individual units, and illustrating the mats in superimposed relation to provide a mat of greater thickness.

Fig. 15 is a perspective view of one of the anchoring rod clamps.

Referring more in detail to the drawings:

1 designates the bank of a river or other stream which is subjected to erosion by an encroaching current, and which is protected by a mat 2 constructed according to the present invention. The mat 2 includes a plurality of individual units 3, each comprising a series of spaced parallel wires or rods 4 to which is secured transverse rods, or wires 5, preferably by welding or the like, to form a unit having open meshes 6 formed between the respective wires.

Each longitudinal wire or rod 4 is shaped in the form of a series of sine curves which cooperate with the curves in an adjacent wire to form corrugations 7 extending across the width of the unit. The corrugations thus provide a series of open work ridges 8 forming obstructions for retarding the current flow and for collecting alluvium and other débris carried in the stream, and which are interposed by a series of valleys 9 formed by the reverse curves to provide ground contacting supports for the mat.

The terminal ends of each of the longitudinal wires are bent, as at 10, between the outermost transverse wires 5 to form substantially semi-circular loops 11, which cooperate with similarly formed loops 12 on the side of an adjacent unit to pass an anchoring rod or cable 13, whereby the individual units are connected together to form continuous rows of mats extending transversely of the height of the bank and out into the bed of the river, as clearly illustrated in Fig. 1.

The ends of the respective anchoring rods are clamped to the innermost units that are located in the bed of the stream by suitable clamps 14, and also at a plurality of intermediate points 15 along the length thereof as desired. The opposite ends of the anchoring rods extend back beyond the edge of the bank and are secured to dead men 16, as in conventional practice.

In Fig. 2 the mat units are arranged with the corrugations extending longitudinally of the bank and the corrugations 17 of the units in one row are staggered with respect to the corrugations 18 in an adjacent row. The upper and lower ends of the units are secured together by rods 19 and 19' extending longitudinally of the bank and transversely of separate anchoring rods 20 that are clamped to selective corrugations of the mats and anchored to the bank by means of dead men similar to the anchoring rods shown in Fig 1.

If desired selective units may be placed in the mat so that the corrugations extend in angular relation to the corrugations of other units thereby providing a more broken surface.

In Fig. 6 the units are placed so that the ends of the corrugations slightly overlap, as at 21, and are laced together by single or double rods 22 and 23, which also form the anchors.

In Fig. 7 is shown a modified form of mat unit wherein the longitudinal wires are shaped to provide a series of reversely arranged corrugations 24 and 25 to provide a mat of greater thickness. The ends of the mat, however, are secured together in the same manner as the units in the preferred form of the invention, as best illustrated in Fig. 4.

Fig. 8 shows a further modified form of the invention, wherein the longitudinal wires 26 are bent to form substantially rectangular shaped corrugations 27 interposed by similar shaped valleys 28, the ends of one unit terminating in horizontal portions 29 which cooperate with vertical portions 30 at the sides of an adjacent unit, connecting ends of said portions being secured together by anchoring rods 31 extending through loop portions 32 in the respective wires, as shown particularly in Fig. 4.

In Fig. 9 the longitudinal wires of the units are bent to form a series of V-shaped ridges and valleys 33 and 34.

In Fig. 10 is shown a construction somewhat similar to that in the preferred form; however the mat units are connected in staggered relation to provide a revetment of cheaper construction.

Fig. 11 shows a further modified form of unit comprising a series of rings 35 connected by longitudinal wires 36. In this form of the invention a series of tubular units are connected together by the anchoring rods 37 extending through loops 38 formed in the respective rings.

Fig. 12 shows a construction similar to that in Fig. 11; however in this form the units are of semi-cylindrical shape and terminate in prongs 39 that are adapted to be impressed into the ground to retain the units in position. The ends of selected units may be connected by corrugated tie wires 40 to allow for expansion and contraction as well as flexibility of the mat constructed thereby.

Fig. 13 is a perspective view of a unit similar to that shown in Fig. 12 but the transverse wires 41 are broken at right angles, as at 42 and 43, and have their ends terminating in prongs 44 and 45.

In Fig. 14 is shown a double mat unit assembly, whereby one unit of the type shown in Fig. 1 is superimposed on the top of another to provide a mat of double thickness. In this form of the invention the transverse wires, however, terminating in substantially U-shaped loops 46 and 47, may be interconnected by suitable clamps or ties 48.

In assembling a mat as illustrated in Fig. 1, the units are positioned in transverse rows with the corrugations in transverse alignment and with the loops 11 lapping the loops 12, after which the anchoring rods 13 are threaded through the loops and attached to the bank by means of the dead men 16. The units may then be attached at points 15 along the length of the anchoring rods by suitable clamps as desired. When thus assembled the mat is very flexible and readily assumes the contour of the bank and bed of the stream on which it is supported, so that the valley portions of the mat directly contact with the bank and bed of the stream over the entire area of the mat. The corrugations project upwardly a sufficient distance from the surface of the bed or bank to provide obstructions for retarding velocity of the encroaching current so that alluvial matter, weeds, roots and other debris carried therewith settle out and are caught by the wires forming the corrugations. In a short time the mat is substantially covered with collected material which also acts as protection against erosion. Owing to the open character of the mat, plenty of space is provided for the rooting of vegetation which may grow up through the meshes thereof, so that in time the roots, debris and wire form an entangled mass to assure against further erosion.

The mat units shown in Fig. 2 are arranged at right angles to the unit in the preferred form so that the corrugations extend longitudinally of the mat and the ends are connected by the tie rods 19 by passing them through the loop portions 11 and 12 as in the preferred form of the invention. The anchoring rods are then attached to selected corrugations and secured to the bank by the dead men similar to the preferred construction.

The forms of mat units shown in the other figures of the drawings may be assembled to form mats in a manner similar to the arrangements shown in Figs. 1 and 2.

While I have particularly described the anchoring members as rods, it is obvious that cables might be substituted therefor without departing from the spirit of the invention.

From the foregoing it is obvious that I have provided a mat which is of simple, inexpensive construction and capable of ready placement to protect any part of a stream where protection is needed. Since the mat units are constructed of wire or flexible rods they will readily assume the shape of the bank and bed of the river without making it necessary to previously shape the bank prior to their installation.

The mats constructed as described promote growth of vegetation because they collect and hold seeds, roots and the like, and provide room for them to take root by reason of the open meshes.

What I claim and desire to secure by Letters Patent is:

1. An open-work mat for accumulating debris including a plurality of preformed open-work units each consisting of a plurality of interconnected longitudinal and transverse members, the longitudinal members being spaced by the transverse members and shaped to provide a series of corrugations extending across the unit, and anchoring rods interconnecting the units for retaining the shape of said corrugations and for anchoring the units to a bank to be protected.

2. An open-work mat for accumulating debris including a plurality of preformed units each consisting of interconnected longitudinal and transverse members and bent to provide corrugations, loop portions formed at the ends of the longitudinal members in registry with similar loops on adjacent units, and anchoring rods extending through said registering loops for flexibly connecting and supporting the units.

3. An open-work mat for accumulating debris including a plurality of corrugated units each formed of interconnected longitudinal and transverse members, loops formed at the ends of selected longitudinal members in registry with similar loops on adjacent units when the corrugations of one unit are located in staggered relation with the corrugations of the adjacent units, and anchoring rods extending through said registering loops for interconnecting and supporting the units.

4. An open-work mat for collecting debris including a plurality of superimposed open-work units each consisting of a plurality of interconnected longitudinal and transverse members, the longitudinal members being formed to provide a series of corrugations extending across the unit, and anchoring rods interconnecting the units for retaining the shape of said corrugations and for anchoring the units to a bank to be protected.

5. An open-work mat for collecting debris including a plurality of superimposed units each formed by interconnected longitudinal and transverse members, loop portions formed at the ends of the longitudinal members in registry with similar loops on adjacent units, and anchoring rods extending through said registering loops for interconnecting and supporting the units.

6. An open-work mat for accumulating debris including a plurality of preformed units each consisting of a plurality of interconnected longitudinal and transverse members, the longitudinal members being bent to provide a series of V-shaped corrugations extending across the unit, and anchoring rods interconnecting the units for retaining the curvature of said longitudinal members and for anchoring the units to a bank to be protected.

7. An open-work mat for accumulating debris including a plurality of preformed units each consisting of interconnected longitudinal and transverse members and bent to provide substantially rectangular corrugations, loop portions formed at the ends of the longitudinal members and engageable with similar loops on adjacent units, and anchoring rods extending through said engaged loops for flexibly connecting and supporting the units.

8. An open-work mat for collecting debris including a plurality of preformed units each consisting of interconnected longitudinal and transverse wires, loop portions formed at the end of the longitudinal wires of one unit in registry with similar loops on adjacent units, anchoring rods extending through said registering loops for interconnecting and supporting the units, and substantially U-shaped loops formed at the ends of the transverse wires for connecting the sides of adjacent units.

9. An open-work mat for accumulating debris including a plurality of preformed open-work units each consisting of a plurality of interconnected longitudinal and transverse members, the longitudinal members being spaced by the transverse members and shaped to provide a series of corrugations extending across the unit, and means interconnecting the units including means for anchoring the units to a bank to be protected.

10. An open-work mat for accumulating debris including a plurality of preformed units each consisting of interconnected longitudinal and transverse members shaped to provide corrugations, loop portions formed at the ends of the longitudinal members in registry with similar loops on adjacent units, and means extending through said registering loops for flexibly connecting and supporting the units.

11. A device of the character described including a preformed open-work unit consisting of a plurality of intercrossed members, certain of said members being spaced by the other of said crossed members and shaped to provide ridge and valley sections on opposite surfaces thereof, and means connected with said members for anchoring the unit to a bank to be protected.

12. In an apparatus of the character described, a plurality of preformed open-work units each consisting of a plurality of intercrossed members, certain of said members being spaced by the other of said crossed members and shaped to provide ridge and valley sections on opposite surfaces thereof, and means connected with said members for anchoring the unit to a bank to be protected.

GEORGE WILLIAM REHFELD.